United States Patent [19]
Sanada

[11] 3,710,706
[45] Jan. 16, 1973

[54] DIAPHRAGM-ACTUATING DEVICE FOR A CAMERA

[75] Inventor: Noriaki Sanada, Tokyo, Japan

[73] Assignee: Canon Kabushiki Kaisha, Tokyo, Japan

[22] Filed: Sept. 16, 1970

[21] Appl. No.: 72,633

[30] Foreign Application Priority Data

Sept. 27, 1969 Japan ........................44/91666

[52] U.S. Cl. ..............................................95/64 R
[51] Int. Cl. ................................................G03b 9/06
[58] Field of Search..........95/64 R, 64 A, 44 R, 46 R

[56] References Cited

UNITED STATES PATENTS 3,211,070  10/1965  Schops........................95/64

FOREIGN PATENTS OR APPLICATIONS 1,285,734  1/1962  France........................95/64

*Primary Examiner*—Samuel S. Matthews
*Assistant Examiner*—Russell E. Adams, Jr.
*Attorney*—Watson, Leavenworth & Kelton

[57] ABSTRACT

A diaphragm-actuating interlocking mechanism in an automatic stop device for a camera includes a rotatable ring mounted at the base of a body tube and operatively associated with an operating mechanism provided in a camera body, and an interlocking arm formed integrally with said rotatable ring and engaging an interlocking pin extended from an aperture ring to thereby open and close a diaphragm upon rotation of said rotatable ring. The interlocking arm includes a slide arm disposed thereon for axial sliding movement with respect to the interlocking arm so that the engagement between the interlocking arm and the interlocking pin takes place via the slide arm, and that the slide arm is axially movable in accordance with the axial movement of the lens tube. Any incorrect stop opening or any time delay of operation can be avoided effectively and the body tube can be made compact.

4 Claims, 4 Drawing Figures

PATENTED JAN 16 1973

3,710,706

DIAPHRAGM-ACTUATING DEVICE FOR A CAMERA

BACKGROUND OF THE INVENTION

1. Field of The Invention

This invention relates to an automatic stop device for a camera, and more particularly to a diaphragm-actuating interlocking mechanism in such automatic stop device mounted within the lens tube of a camera.

2. Description of The Prior Art

A most typical example of the mechanism of the described type includes, as shown in FIG. 1, a rotatable ring 2 having a pin studded therein for engaging an operating mechanism provided in a camera body. The rotatable ring 2 is mounted at the base of the body tube and provided with an interlocking arm 3 extending therefrom in the opposite direction to the pin 1. The interlocking arm 3 is in engagement with an interlocking pin 6 extending from an aperture ring 5 which governs the opening of diaphragm leaves 4 (one of which is shown). Return springs 7 and 8 are connected to the rotatable ring 2 and the aperture ring 5 respectively, the spring 7 having a greater spring force than the spring 8.

In this known arrangement, rotation of the rotatable ring 2 is transmitted through the arm 3 and pin 6 to the aperture ring 5 so as to stop down the diaphragm leaves 4. However, the aperture ring 5, diaphragm leaves 4, etc. forming the stop device are all axially movable in accordance with the lens focusing operation, and this makes it necessary that the interlocking pin 6 have a considerably great length. On the other hand, the pin 6 should not have a great diameter or a sturdy construction because of certain functional requirements and such pin tends to be deflected during the diaphragm setting operation as in the case of a close-up shot where the lens is in its foremost position, thus resulting in an incorrect stop opening or in a time delay of operation. These disadvantages are conspicuous especially in a lens like a long focus lens having a great diameter and moved forward a great distance for a short-distance focusing.

Another typical example of the known interlocking mechanism employs, as shown in FIG. 2, an elongated arm 3 engaging a projection 6' formed, in lieu of a pin, in the outer circumference of an aperture ring 5. This arrangement is meritorious in that the disadvantages mentioned with respect to the arrangement of FIG. 1 can be avoided to some extent, whereas the formation of such projection in the outer circumference of the aperture ring gives rise to a requirement that the interlocking mechanism be carefully arranged so as not to obstruct the movement of the projection. In addition, the lens tube becomes greater in diameter and this, together with the great length of the interlocking arm 3, leads to such a greater space occupied by the entire mechanism that would be unsuitable especially for use with a long focus lens.

SUMMARY OF THE INVENTION

The present invention contemplates to overcome the foregoing disadvantages inherent to the prior art and provide an improved diaphragm-actuating interlocking mechanism in an automatic stop device, which comprises a rotatable ring mounted at the base of a body tube and operatively associated with an operating mechanism provided in a camera body, an interlocking arm formed integrally with said rotatable ring and engaging an interlocking pin extended from one side of an aperture ring to thereby open and close a diaphragm upon rotation of said rotatable ring, said interlocking arm including a slide arm disposed thereon for axial movement with respect to said interlocking arm so that the engagement between said interlocking arm and said interlocking pin of said aperture ring takes place via said slide arm, and a lens tube axially movable to move said slide arm therewith axially of said interlocking arm.

According to the present invention, the interlocking pin is made so short as to produce no deflection during the operation of the mechanism, and the interlocking arm has at least two guide pins studded therein which are received in an elongated slot formed in the slide arm axially thereof so that the slide arm may be moved axially with respect to the interlocking arm. The lens tube has opposite shoulder means formed circumferentially thereof and the slide arm is confined between these opposite shoulder means so as to be moved axially with the lens tube.

DESCRIPTION OF THE PREFERRED EMBODIMENTS

Figure 3:
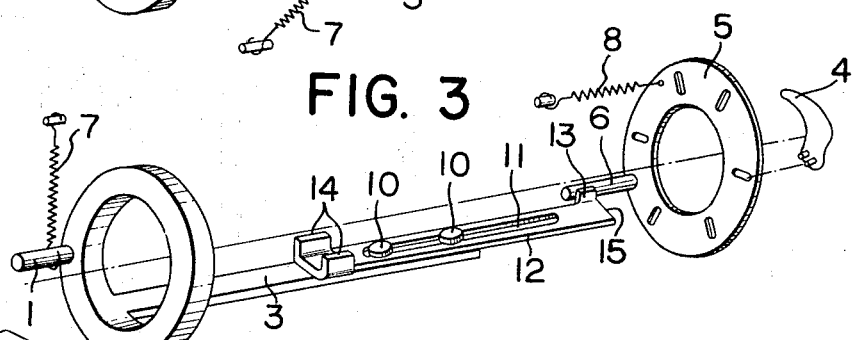
FIG. 3 is a perspective view showing an example of the diaphragm-actuating interlocking mechanism according to the present invention.
Figure 4:
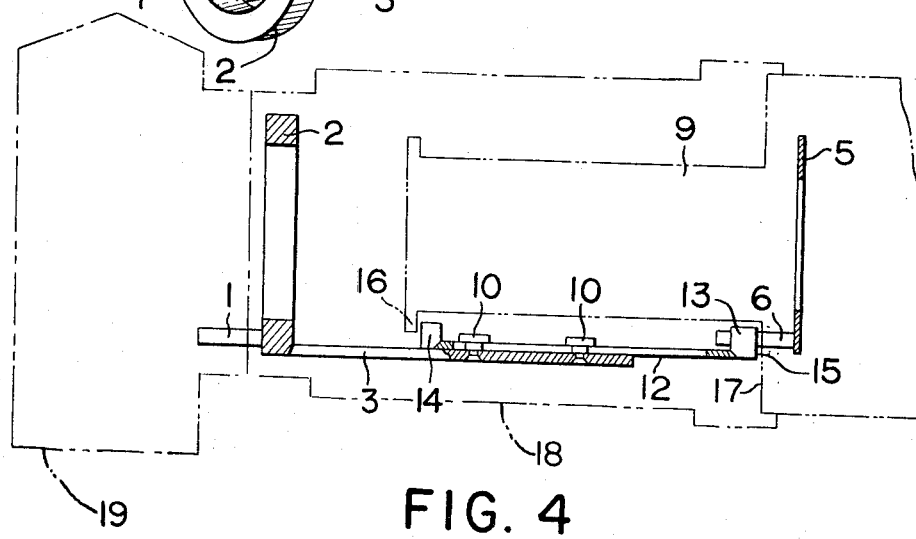
FIG. 4 is a longitudinal sectional view of the mechanism shown in FIG. 3.

Referring to FIGS 3 and 4, a rotatable ring 2 mounted at the base of a body tube 18 has a pin 1 engaging an operating mechanism (not shown) mounted in a camera body 19. An interlocking arm 3 is formed integrally with the rotatable ring 2 and extends therefrom in the opposite direction to the pin 1. An aperture ring 5, which governs the opening of diaphragm leaves 4 (only one leaf of which is shown), has a short interlocking pin 6 studded in one side thereof. Return springs 7 and 8 are connected to the rings 2 and 5 respectively, in a known manner. The aperture ring 5 and diaphragm leaves 4 are mounted for axial movement within a lens tube 9 indicated by imaginary lines in FIG. 4.

It should be noted that the interlocking arm 3 has two guide pins 10, 10 studded therein which are received in an elongated slot 11 formed through a slide arm 12 axially thereof, and the slide are 12 is disposed on the interlocking arm 3 in the overlapping relationship therewith. Thus, the slide arm 12 is allowed to slide axially with respect to the underlying arm 3. The slotted slide arm 12 has a projection 13 formed at one end and engaging the short interlocking pin 6, and a pair of projections 14 formed at the other end. As shown in FIG. 4, the opposite ends 14 and 15 of the slide arm 12 are in abutment with shoulder means 16 and 17 formed circumferentially of the lens tube 9 respectively, and thus the slide arm 12 is confined between these shoulder means 16 and 17 so that it is slidable in accordance with the axial movement of the lens tube 9 during the focusing operation.

Figure 1:
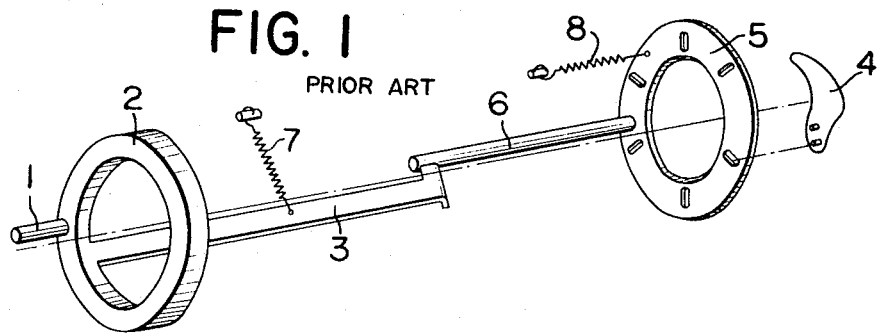
FIG. 1 is a perspective view showing an example of the known diaphragm-actuating interlocking mechanism used in an automatic stop device for a camera.
Figure 2:
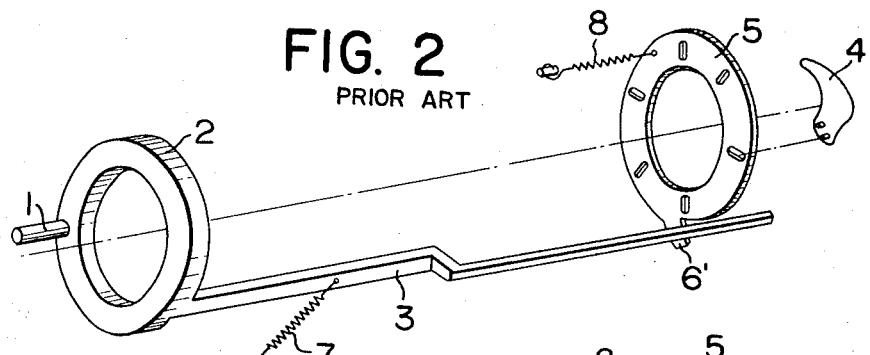
FIG. 2 is a similar view showing another example of such known mechanism.

With this arrangement, rotation of the rotatable ring 2 causes the arm 3 and slide arm 12 to be rotated about the axis of the ring 2, thereby rotating the aperture ring 5 via the pin 6. This is substantially the same as in the known arrangement shown in FIG. 1 and described previously. It should be noted, however, that any axial displacement of the lens tube 9, aperture ring 5, etc. taking place during the focusing operation causes the slide arm 12 to axially move with respect to the interlocking arm 3 to adjust the combined length of the arms 3 and 12 as if the arm 3 itself were expanded or constricted, whereby the projection 13 of the arm 12 and the interlocking pin 6 of the aperture ring 5 are maintained in a predetermined engagement with each other.

Thus, according to the present invention, the slide arm 12 provided in the described manner serves to produce such an effect as if the interlocking arm 3 of the rotatable ring 2 were expanded or constricted in accordance with the axial movement of the lens tube 9, and this permits the interlocking pin 6 of the aperture ring 5 to be of a very short length even if the lens in use is a long focus lens. Accordingly, even in the foremost position of the lens, the interlocking pin 6 is free of deflection during the diaphragm setting operation nand any incorrect stop opening or any time delay of operation can be avoided with ease. Furthermore, the slidable arm 12 combined with the interlocking arm 3 serves to greatly reduce the size of the entire body tube 18 as compared with the known type which employs an elongated unitary interlocking arm for engaging the projection formed in the outer circumference eof the aperture ring.

What is claimed is:

1. A diaphragm-actuating interlocking mechanism in an automatic aperture stop device for a camera, comprising a ring rotatably mounted at the base of a body tube for joining a lens assembly to a camera body, said ring being arranged for operative association with an operating mechanism in said camera body, a lens tube telescopingly interfitted with said body tube, said lens assembly being carried by said lens tube and including a diaphragm controlled by an aperture ring, an interlocking arm formed integrally with said rotatable ring and projecting through said body tube toward said aperture ring, a slide arm joined to said interlocking arm for relative sliding axial movement, said slide arm engaging an interlocking pin projecting from one side of said aperture ring for opening and closing said diaphragm responsive to rotation of said rotatable ring, and means interconnecting said lens tube with said slide arm for joint axial movement relative to said interlocking arm.

2. A diaphragm-actuating interlocking mechanism according to claim 1, wherein said interlocking arm has at least two guide pins studded therein and said slide arm has an elongated slot formed therethrough for receiving said guide pins, whereby said guide pins and said elongated slot cooperate together to permit the axial movement of said slide arm.

3. A diaphragm-actuating interlocking mechanism as defined in claim 1, wherein said lens tube has opposite shoulder means formed circumferentially thereof for confining said slide arm therebetween to thereby permit said slide arm to be moved with said lens tube.

4. A diaphragm-actuating interlocking mechanism as defined in claim 5, wherein said interlocking pin of said aperture ring has a short length only long enough to engage the closely adjacent end of said slide arm.

* * * * *